Dec. 13, 1949  W. H. BURGESS  2,491,031
RECTIFIER
Filed Feb. 17, 1947  2 Sheets-Sheet 1
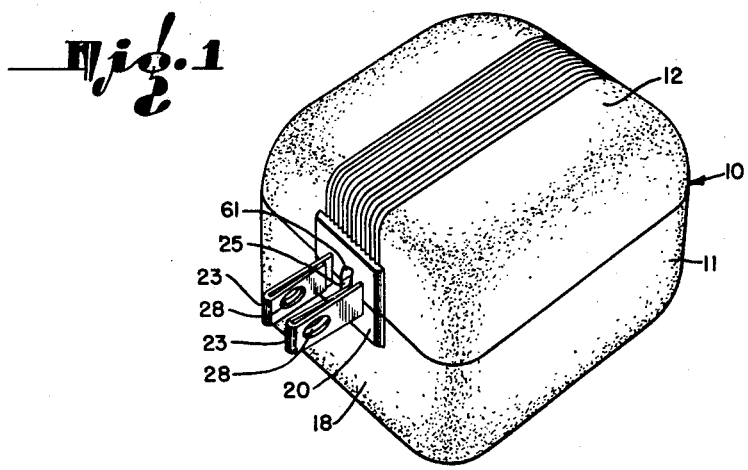
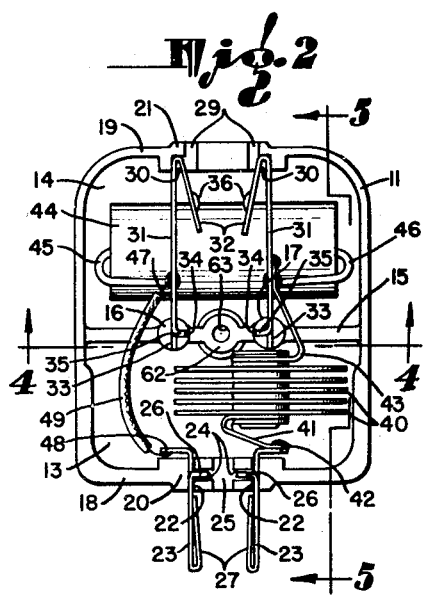
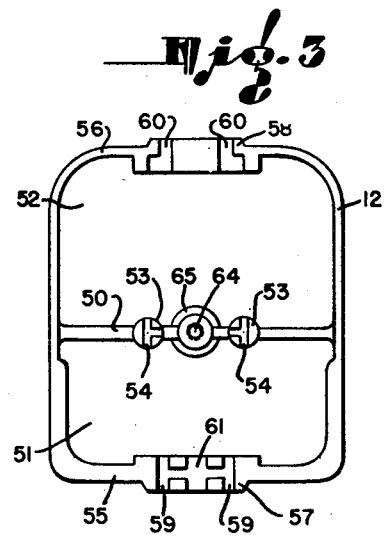
INVENTOR.
WILLIAM H. BURGESS
BY
ATTORNEY Dec. 13, 1949     W. H. BURGESS     2,491,031
RECTIFIER
Filed Feb. 17, 1947     2 Sheets-Sheet 2
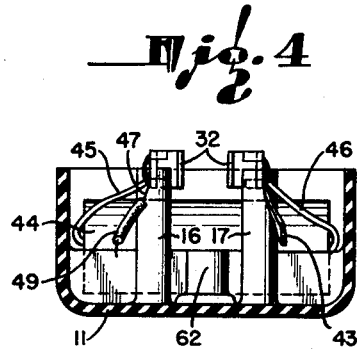
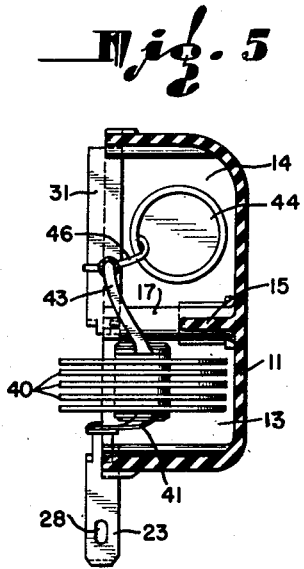
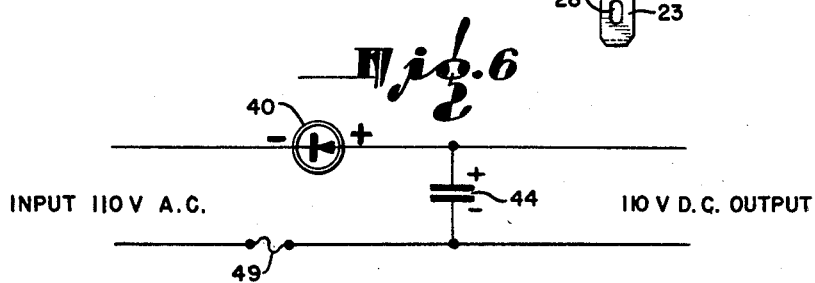
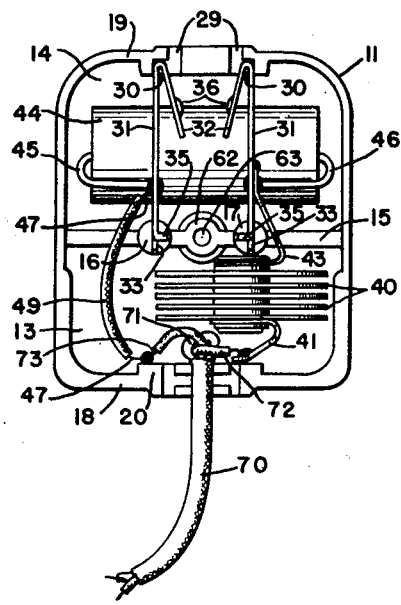
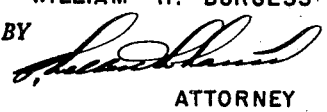
*INVENTOR.*
WILLIAM H. BURGESS
BY
ATTORNEY Patented Dec. 13, 1949

2,491,031

UNITED STATES PATENT OFFICE 2,491,031

RECTIFIER

William H. Burgess, Pasadena, Calif., assignor, by mesne assignments, to David A. Marcus, Los Angeles, Calif.

Application February 17, 1947, Serial No. 729,141

12 Claims. (Cl. 321—8)

This invention relates to rectifiers, and has as its general object to provide a simple and compact arrangement of rectifier parts in a cabinet or case to produce a rectifier unit adapted for use in connection with household appliances, such as, for example, electric shavers.

It has been found that the ordinary electric shaver, which has been designed to operate on 110–120 volts, 50 or 60 cycles commercial electric current, will operate better on a direct current of the same voltage. When energized by an alternating current, a shaver motor operates in a synchronous manner, but on direct current such a motor operates non-synchronously and is able to attain greater speed and power than the synchronous speed of alternating current operation, and, consequently, develops faster and more efficient cutting ability without exceeding the shaver manufacturer's rating.

Since the power supply for home use is almost always in the form of alternating current, there is a definite need for a compact rectifier unit which can be employed in conjunction with an electric shaver, which can be plugged into an electric outlet, which has means into which the extension cord of the electric shaver may be plugged, which can be readily serviced for repair or replacement of parts, and which is relatively fool-proof.

The present invention provides a rectifier having these characteristics.

A further object of the invention is to provide a device of this character which, in addition to the foregoing characteristics, embodies a case which is so constructed and arranged and is of such material as to provide suitable supporting means for the electrical contact parts of the socket and permits a ready assembly and disassembly of the device.

Another object is to provide a compact rectifier unit which is so constructed as to permit ready removal of the various operative parts of the device, for testing, replacement or repair, and yet which when closed encases said parts quite snugly and with very little waste space. These requirements are fulfilled by providing a two-part case, each part of which includes cooperating portions for supporting and securing the contact members.

A further object is to provide a rectifying device embodying a compact arrangement of a selenium rectifier unit, condenser, plug-in socket and contacts for plugging into a receptacle, all compactly arranged in a small case and all exposed for ready access for servicing when the cover of the case is removed. Each part of the case is provided with a transverse reinforcing partition wall intermediate the ends, to partly define a pair of chambers for reception of the rectifier and condenser respectively.

A still further object of the invention is to provide a device of this character wherein the rectifier and condenser are supported by the contact members and are removable with said members.

Still another object of the invention is to provide a device of this character wherein the condenser and the rectifier are respectively attached to the inlet and outlet contacts, said condenser and rectifier being resiliently suspended within the case out of contact with the walls, partitions and contact supporting members, so that said condenser and a rectifier will not readily be injured by jars or blows to which the case might be inadvertently subjected.

A further object is to provide a rectifier embodying a case which, in connection with the arrangement mentioned above, embodies supports for various parts, which supports are integrally formed with the top and bottom portions of the case in order to reduce the number of parts and the cost of manufacture.

Further objects and advantages of the invention will be brought out in the following part of the specification.

A still further object of the invention is to provide a rectifier of the present character, wherein one of the connecting wires between the inlet and outlet contacts is of small size, so that it will serve as a fuse which will blow out and prevent injury to the rectifier in the event of an overload.

Referring to the drawings, which are for illustrative purposes only,

Fig. 1 is a perspective view of a rectifying device embodying the present invention;

Fig. 2 is a plan view of the lower housing or casing member with the operating parts of the device installed;

Fig. 3 is a plan view of the interior of the upper housing or casing member;

Fig. 4 is a sectional view taken on line 4—4 of Fig. 2;

Fig. 5 is a sectional view taken on line 5—5 of Fig. 2;

Fig. 6 is a wiring diagram of the device; and

Fig. 7 is a plan view of the interior of the lower housing or casing member with the operating parts of the device installed and showing an alternative arrangement of the invention.

Referring to Fig. 1, reference numeral 10 indicates the housing or case generally, which is of suitable plastic material, and which is a nonconductor of electricity. This case comprises two parts, indicated at 11 and 12 respectively, and which, for convenience, will be termed the bottom or body, and the top or cover respectively.

Referring to Figs. 2, 4 and 5, the body member 11 is shown as being divided into two compartments, indicated at 13 and 14, by a low partition 15 which extends transversely of the body and from which extend integral posts 16 and 17 which terminate at their upper ends in the upper plane of the body 11.

The end walls 18 and 19 of the body have thickened portions 20 and 21 respectively, the thickened portion 20 having longitudinally extending notches 22 disposed on opposite sides of the longitudinal center of the body. The notches 22 are spaced apart a sufficient amount to properly space a pair of inlet contact members 23 which have portions received in said notches. The thickened portion 20 also has notches 24 which extend toward each other from the notches 22 and terminate at a notch 25 which extend longitudinally of the device intermediate said notches 22, said notch 25 being for a purpose hereinafter described. Each of the contact members 23 is provided with upper and lower laterally turned ears 26, the lower ears 26 being received in the notches 24, and hold the contact members 23 against longitudinal movement.

The contact members 23 have portions which project outwardly of the adjacent wall 18, and said portions have parts 27 which are turned back against the adjacent sides of said projecting portions. The contacts 23 are provided with openings 28 therein, which are adapted to cooperate with lugs on the respective contacts of electrical outlets in the well known manner.

The thickened part 21 of the wall 19 is provided with a pair of laterally spaced longitudinally extending notches 29 which have portions 30 adjacent their inner ends which extend outwardly.

A pair of outlet contact members 31 are provided and each of these contact members has a portion 32 which is turned inwardly so as to form V-like ends, the apex of each end being received in the portions 30 of the notches 29 for supporting said ends. The opposite ends of said members 31 are received in notches 33 which extend longitudinally in the upper ends of the posts 16 and 17 respectively, each of said notches having laterally extending parts 34. The adjacent end of each of the contacts 31 is provided with upper and lower laterally turned ears 35, the lower of which are received in said parts 34. Thus, the contacts 31 are held securely in position and are adapted for contact with the prongs of an electric plug, said prongs being insertable in the notches 29. It is to be noted that the laterally turned portions 32 are provided with small lugs 36 which are adapted to cooperate with openings in the prongs of the plug and form a secure contact. In the compartment 13 there is disposed a selenium rectifier 40 which is of well known character, one end of said rectifier being connected by a strip of metal 41 to a laterally turned end 42 of one of the contacts 23. The other end of the rectifier is connected to one of the contacts 31 by means of a metal strip 43. The strips 41 and 43 support the rectifier in the compartment 13 out of contact with the inner surfaces of the body walls, as will be apparent from Figs. 2 and 5.

Within the compartment 14 is a condenser 44 having its terminals 45 and 46 connected, as by soldering or the like, to the respective contact members 31, said condenser being suspended in the compartment 14 out of contact with the inner surfaces of the walls of the body 11. The terminals 46 comprise wires which are somewhat resilient, and the same is true of the connections 41 and 43.

The other terminals 23 and 31 are connected together by a wire 47, one end of said wire being soldered to said terminal 31 and the other end being soldered to a laterally turned portion 48 of said terminal 23. The wire 47 is covered by a piece of tubular insulation 49, and said wire 47 is of relatively small gauge so as to serve as a fuse means which will melt should the device be subjected to an overload. Thus the appliance receiving power from the device is protected from injury due to any such overload.

Referring to Fig. 3, it will be seen that the cover is also provided with a partition 50 which extends transversely of the device and divides said cover into compartments 51 and 52, there being posts 53 which are formed integrally with the partition and which have notches 54 therein, corresponding to the notches in the free ends of the posts 16 and 17. The end walls 55 and 56 have thickened portions 57 and 58 which have notches 59 and 60 respectively, which correspond with the respective notches in the thickened portions 20 and 21 of the body 11. There is also a notch 61 in the thickened portion 57 which corresponds with the notch 25 in the thickened portion 20. Thus, when the cover is placed on the body 11, the notches 54, 59 and 60 receive portions of the contacts 23 and 31 in a manner similar to the reception of said contact members by the notches in said body.

The partition 15 has a central enlargement 62 having an opening 63 therein, for reception of a screw which is adapted to be screwed into a threaded bore 64 in an enlarged portion 65 of the partition 50, the cover 12 being secured to the body 11 by means of said screw, not shown in the drawings.

It is to be noted that the upper portion of the rectifier 40 also extends outwardly of the plane of the open end of the body and said outwardly extending portion of the rectifier is received in the chamber 51 and out of contact with the inner surfaces of the walls thereof.

In assembling the device the contacts 31, one of the contacts 23, the rectifier and the condenser, are so connected together as to be insertable as a unit, and said parts are removable in like manner. Thus the assembly or disassembly of the device is an extremely simple matter.

In using the device, the free ends of the contact members 23 are inserted in any conventional outlet, and the plug of an appliance to be supplied with direct current by the device is inserted in the notches 29.

In the arrangement shown in Fig. 7, the contact members 23 are not used. Instead, an electric cord 70 is provided and the end adjacent the device is received in the slot or opening provided by the notches 25 and 61. The wires of the cord 70 are knotted at 71 adjacent the inner side of the wall 18, to prevent the cord from being pulled out of the housing 10. One of the wires, 72, of the cord is secured to the metal strip 41 by means of soldering or the like, and the other wire 73, is connected to the adjacent end of the wire 47 by means of soldering or the like.

In this arrangement of the device the cord 70 would, of course, have a plug at its opposite end for plugging into a suitable electrical outlet.

I claim:

1. In a rectifying device, comprising: a case having a hollow interior; a pair of spaced contact members within the case; a condenser unit connected to the contact members; a rectifier unit; resilient means connecting the rectifier unit to one of the contact members for supporting said rectifier in spaced relation to the walls of said case; and means for connecting the rectifier and the other contact member with a source of power.

2. In a device of the class described, comprising: a case; a pair of inlet contact members extending longitudinally outwardly of the case; a pair of outlet contact members extending longitudinally within the case; means supporting one pair of contact members in spaced relation to the other pair and supporting the contact members of each pair in spaced relation to each other; a rectifier unit attached to one of the inlet contact members and one of the outlet contact members and supported thereby in spaced relation to the walls of the case; and a condenser unit connected to the outlet contact members and supported thereby in spaced relation to the walls of the case.

3. In a device of the class described, comprising: a case having a hollow interior; a pair of spaced contact members within the case; a condenser unit connected to the contact members and resiliently supported thereby in spaced relation to the walls of said case; a rectifier unit; means connecting the rectifier unit to one of the contact members for supporting said rectifier in spaced relation to the walls of said case; and means for connecting the rectifier and the other contact member with a source of power.

4. In a rectifying device, comprising: a case having a body part and a cover part divided along a generally medial plane, said parts including end walls; a pair of spaced notches in each of the walls extending from the free edges thereof; notches extending laterally toward each other from one pair of notches; a pair of contact members having lateral extensions received in said notches; the notches in the other wall having outwardly extending portions; a pair of inwardly extending posts inwardly of each part of the case and having their free ends terminating in the plane of the open sides of the case parts; notches in said free ends of the posts, said notches including parts extending laterally thereof and toward each other; a pair of contact members having laterally extending flanges adjacent their inner ends for reception in the notches in the posts, the outer ends of said contact members being received in the extensions of the notches in said other wall; inwardly turned portions adjacent the outer ends of the last mentioned contact members adapted to be engaged by the contacts of a plug; a rectifier within the case connected between one of the inlet and one of the outlet contact members; a condenser connected to the outlet contact members; and means for securing the parts of the case together.

5. In a device of the class described, comprising: a case comprising a plurality of parts; a pair of outwardly extending inlet contact members; a pair of outlet contact members within the case; means for removably securing the contact members in their operative positions; a condenser connected to the outlet contact members; a rectifier connected between one of the inlet contact members and one of the outlet contact members and a fine wire connecting the other inlet member with the other outlet contact member and adapted to serve as a fuse to prevent overloading.

6. In a device of the class described, comprising: a case having a hollow interior; a pair of spaced contact members within the case; a condenser unit resiliently connected to the contact members and supported thereby in spaced relation to the walls of the case; a rectifier unit; resilient means connecting the rectifier unit to one of the contact members and supporting said rectifier in spaced relation to the walls of said case; and means for connecting the rectifier and the other contact member to a source of power.

7. In a device of the class described, comprising: a case divided into two parts along a plane, each of said parts having end walls; a pair of spaced corresponding notches in the adjacent end walls of said parts, said notches extending from the free edges of said end walls and having laterally extending portions; a pair of supports for each of the parts of the case having their free ends substantially meeting at said plane, said free ends having notches therein which include laterally extending portions; a pair of contact members within the case having their outer ends supported in the lateral extensions of the first mentioned notches; laterally extending flanges on said contacts adjacent their opposite ends for reception in the notches in the supports; an electrical element supported by and connected to said contact members; and means for securing the parts of the case together.

8. In a device of the class described, comprising: a two-part case having a plane of division, each of said parts having end walls; a plurality of spaced notches in the adjacent end walls of the parts, said notches having lateral extensions; a pair of outwardly extending contacts adapted to be connected to electrical elements within the case and having lateral flanges adjacent their inner ends, said ends being received in said notches; and means for securing the parts of the case together.

9. In a device of the class described, comprising: a case having a body part and a cover part divided along a generally medial plane, said parts including end walls; a pair of spaced notches in each of the walls extending from the free edges thereof; notches extending laterally toward each other from one pair of notches; a pair of contact members having lateral extensions received in said notches; the notches in the other wall having outwardly extending portions; a transverse partition in each part of the case; a pair of posts extending from the base of each partition and having their free ends terminating in the plane of the open sides of the case parts; notches in said free ends of the posts, said notches including parts extending laterally thereof and toward each other; a pair of contact members having laterally extending flanges adjacent their inner ends for reception in the notches in the posts, the outer ends of said contact members being received in the extensions of the notches in said other wall; inwardly turned portions adjacent the outer ends of the last mentioned contact members adapted to be engaged by the contacts of a plug; a rectifier within the case connected between one of the inlets and one of the outlet contact members; a condenser connected to the outlet contact members; and means for securing the parts of the case together.

10. In a rectifying device: a case having a hollow interior; a pair of spaced contact members projecting into said interior; a rectifier unit within said hollow interior; and resilient means connecting the rectifier unit to one of the contact members for supporting said unit in spaced relation to the walls of said case.

11. In a device of the class described: including a case having a hollow interior; a pair of spaced contact members projecting into the hollow interior of said case and supported adjacent the ends thereof; a condenser unit disposed within said hollow interior; and resilient means connecting said condenser to said contact members intermediate the ends thereof for supporting said condenser in spaced relation to the walls of said case.

12. In a device of the class described, comprising: a case divided into two parts along a plane, each of said parts having end walls; a pair of spaced corresponding notches in the adjacent end walls of said parts, said notches extending from the free edges of said end walls and having laterally extending portions; a pair of supports for each of the parts of the case having their free ends substantially meeting at said plane, said free ends having notches therein which include laterally extending portions; a pair of contact members within the case having their outer ends supported in the lateral extensions of the first mentioned notches; laterally extending flanges on said contacts adjacent their opposite ends for reception in the notches in the supports; an electrical element supported by and connected to said contact members; and a screw for securing the parts of the case together, said screw being located adjacent the center of the case.

WILLIAM H. BURGESS.

REFERENCES CITED

The following references are of record in the file of this patent:

UNITED STATES PATENTS

| Number | Name | Date |
|---|---|---|
| 1,251,377 | Hull | Dec. 25, 1917 |
| 1,751,360 | Ruben | Mar. 18, 1930 |
| 1,892,567 | Craddock | Dec. 27, 1932 |
| 2,243,573 | Murphy | May 27, 1941 |
| 2,327,511 | De Lange et al. | Aug. 24, 1943 |

FOREIGN PATENTS

| Number | Country | Date |
|---|---|---|
| 304,579 | Great Britain | Jan. 24, 1929 |